United States Patent
Kawamura

(10) Patent No.: US 11,233,457 B2
(45) Date of Patent: Jan. 25, 2022

(54) POWER CONVERSION DEVICE

(71) Applicant: Mitsubishi Electric Corporation, Tokyo (JP)

(72) Inventor: Mao Kawamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 27 days.

(21) Appl. No.: 16/857,330

(22) Filed: Apr. 24, 2020

(65) Prior Publication Data
US 2020/0403516 A1    Dec. 24, 2020

(30) Foreign Application Priority Data

Jun. 20, 2019 (JP) .............................. JP2019-114332

(51) Int. Cl.
*H02M 3/335* (2006.01)
*H02M 1/08* (2006.01)
*H02M 1/00* (2006.01)

(52) U.S. Cl.
CPC ......... *H02M 3/33569* (2013.01); *H02M 1/08* (2013.01); *H02M 1/0009* (2021.05)

(58) Field of Classification Search
CPC .. H02M 3/33569; H02M 1/08; H02M 1/0009; H02M 1/0051; H02M 1/0012; H02M 1/38; H02M 3/337
See application file for complete search history.

(56) References Cited

U.S. PATENT DOCUMENTS

| | | | | |
|---|---|---|---|---|
| 8,335,090 B2* | 12/2012 | Huang | ................... | H02J 3/381 |
| | | | | 363/17 |
| 8,619,437 B2* | 12/2013 | Hachiya | ............ | H02M 3/33507 |
| | | | | 363/20 |
| 2002/0131224 A1* | 9/2002 | Yoshida | ................ | H02M 3/156 |
| | | | | 361/93.5 |

(Continued)

FOREIGN PATENT DOCUMENTS

| | | |
|---|---|---|
| JP | 2008-048032 A | 2/2008 |
| JP | 2010-252610 A | 11/2010 |
| JP | 2011-055602 A | 3/2011 |

(Continued)

OTHER PUBLICATIONS

Communication dated Aug. 25, 2020, from the Japanese Patent Office in Application No. 2019-114332.

(Continued)

*Primary Examiner* — Kyle J Moody
(74) *Attorney, Agent, or Firm* — Sughrue Mion, PLLC; Richard C. Turner

(57) ABSTRACT

The present application provides a power conversion device such that input current and output current can be accurately estimated without providing a special circuit. A DC-DC converter including a control unit and semiconductor switching elements is such that a current detecting current transformer is connected in series between a high voltage battery and the semiconductor switching elements, in addition to which the DC-DC converter includes a current-to-voltage conversion circuit on a secondary side of the current transformer, and the control unit estimates an input current from an AD conversion value input from the current-to-voltage conversion circuit.

9 Claims, 9 Drawing Sheets

(56) References Cited

U.S. PATENT DOCUMENTS

2016/0204648 A1* 7/2016 Kawamura ............... H02J 7/14
320/107
2019/0190259 A1* 6/2019 Ludwig ............... H02H 11/002

FOREIGN PATENT DOCUMENTS

| JP | 2011-122939 A | 6/2011 |
|---|---|---|
| WO | 2018/211557 A1 | 11/2018 |

OTHER PUBLICATIONS

Communication dated Dec. 1, 2020 from the Japanese Patent Office in Application No. 2019-114332.

* cited by examiner

DUTY RATIO D SMALL

DUTY RATIO D LARGE

ON-STATE SECTION α

OFF-STATE SECTION β

ON-STATE SECTION α

OFF-STATE SECTION β

POWER CONVERSION DEVICE

BACKGROUND OF THE INVENTION

Field of the Invention

The present application relates to a power conversion device.

Description of the Related Art

In recent years, electric vehicles (EV), and hybrid vehicles such as hybrid electric vehicles (HEV) and plug-in hybrid electric vehicles (PHEV), have been developed as environmentally friendly vehicles. A drive battery that causes an electric traction motor to drive using charged energy is mounted in this kind of vehicle, in addition to an auxiliary battery, mounted in existing vehicles, that causes a control circuit to operate. Also, reflecting progress in power electronics technology, an increase in power conversion device reliability has become an urgent requirement for this kind of vehicle in recent years.

For example, an insulated step-down DC-DC converter is being used in this kind of electric vehicle as a direct current conversion device needed in order to carry out charging of an auxiliary battery from a drive battery that supplies power to an electric motor.

This DC-DC converter generally includes a function of stepping down voltage from a primary side high voltage battery (for example, a lithium ion battery) and charging a secondary side low voltage battery (for example, a lead-acid battery). In order to increase the quality of an electric vehicle in which this DC-DC converter is mounted, it is necessary to accurately ascertain an input current (an amount of current discharged from the high voltage battery) and an output current (an amount of current that charges the low voltage battery) of the DC-DC converter in order to confirm that the DC-DC converter is able to correctly charge the battery.

Generally, it is necessary to provide a current sensor on the secondary side of a DC-DC converter in order to accurately measure output current, but in order to measure current in a portion through which a large current flows, the cost of the aforementioned current sensor increases.

A method whereby a current sensor circuit is provided on a primary side, and current flowing through a primary coil is estimated as a secondary side output current based on results of detecting input voltage and output current, a turn ratio of a transformer, inductance of the primary coil, and a switching frequency of a power switch element, has been proposed in, for example, Patent Literature 1.
Patent Literature 1: JP-A-2010-252610

However, the following kinds of problem exist with the existing method disclosed in Patent Literature 1.

1. A duty ratio of a switching element and a result of a current/voltage conversion are non-linear, meaning that the greater the duty ratio, the greater an input current error, and by extension, the greater an estimated output current error.

2. Also, in order to restrict an effect on temperature change, it is necessary to correct setting values of the primary coil inductance, a diode forward voltage, and a main switch on-state voltage, which affect temperature.

However, as a result of diligent research into the main factors affecting temperature, and repeated trial and error, the inventors have found that the effect of diode recovery characteristics is greater than the effect of temperature, which has led to the completion of the present application.

SUMMARY OF THE INVENTION

The present application discloses technology for resolving the aforementioned kinds of problem, and has an object of providing a power conversion device such that input current and output current can be accurately estimated without providing a special circuit.

A power conversion device disclosed in the present application includes an inverter device that is connected to an input power supply generating a direct current voltage, has a multiple of switching elements, and converts the direct current voltage into an alternating current voltage by switching between an on-state and an off-state of the switching elements, a transformer that has a primary winding and a secondary winding, converts a voltage applied across the primary winding by the inverter device into a differing voltage, and outputs the differing voltage to the secondary winding, a rectifying circuit that rectifies an alternating current voltage output from the secondary winding of the transformer, a smoothing reactor that smoothes an output from the rectifying circuit, a smoothing capacitor that smoothes a voltage waveform of a current flowing through the smoothing reactor, and outputs the smoothed voltage waveform as an output voltage, a control unit that controls the switching elements so as to be turned on and off, an input current detecting circuit that has a first winding and a second winding magnetically coupled to the first winding, wherein the first winding is connected in series between the input power supply and the switching elements, and a current-to-voltage conversion circuit connected to the second winding of the input current detecting circuit, wherein a voltage output from the current-to-voltage conversion circuit is input as an AD conversion value into the control unit, and the control unit estimates a current input into the inverter device from the AD conversion value.

According to the power conversion device disclosed in the present application, a power conversion device such that an amount of input current and an amount of output current can be accurately estimated, without providing a special circuit, is obtained.

The foregoing and other objects, features, aspects, and advantages of the present application will become more apparent from the following detailed description of the present application when taken in conjunction with the accompanying drawings.

DETAILED DESCRIPTION OF THE PREFERRED EMBODIMENTS

Figure 1:
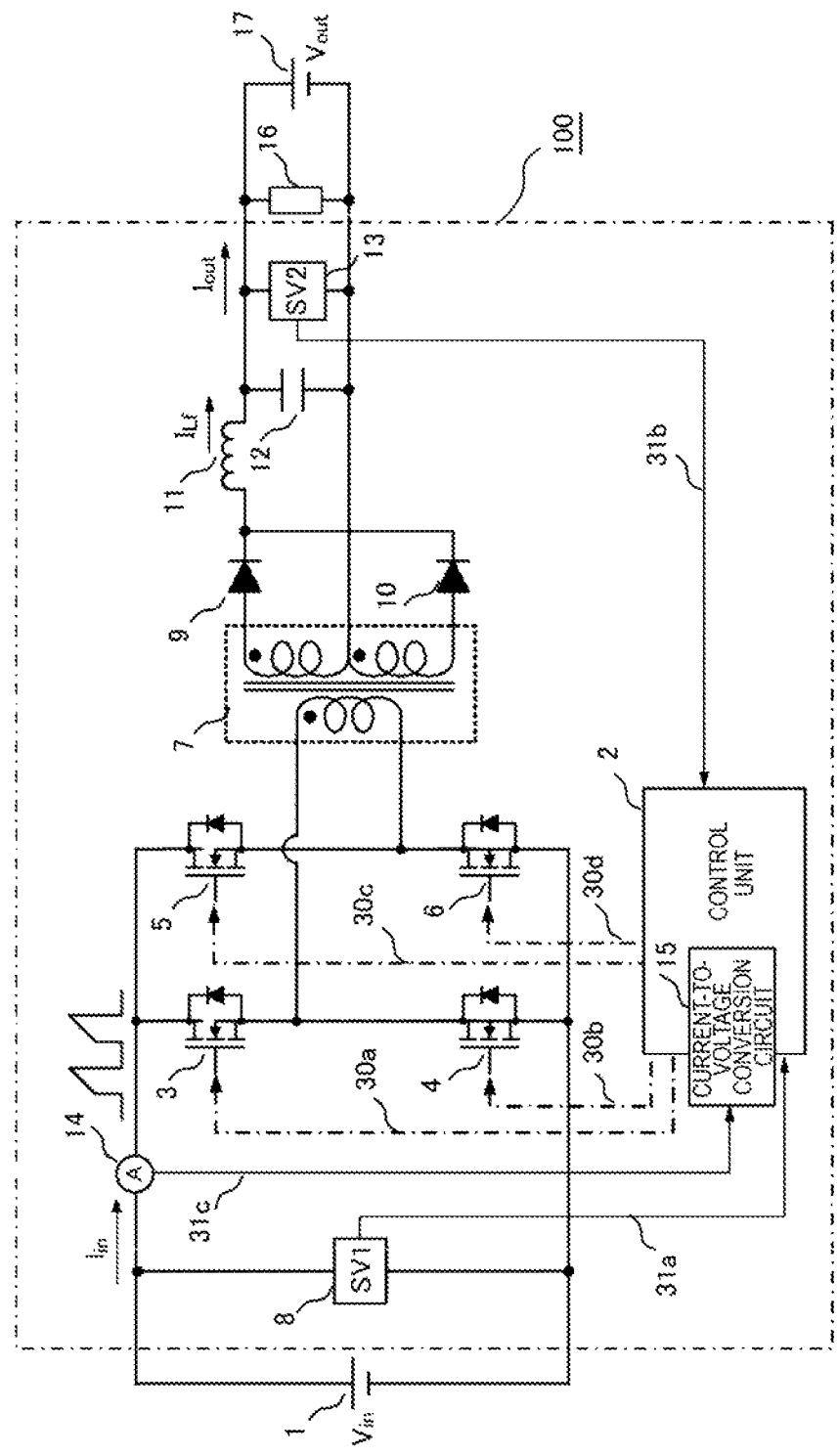
FIG. 1 is a circuit diagram showing a configuration of a power conversion device according to a first embodiment.

Hereafter, using the drawings, preferred embodiments of a power conversion device according to the present application will be described. Identical reference signs are allotted to identical or corresponding portions in the drawings, and redundant descriptions will be omitted. Also, each embodiment will be described with an insulated DC-DC converter as an example of a power conversion device.

First Embodiment

FIG. 1 is a drawing showing a circuit diagram of a DC-DC converter according to a first embodiment.

In FIG. 1, a DC-DC converter 100 is configured to include each of a control unit 2, semiconductor switching elements (hereafter called switching elements) 3 to 6 that configure an inverter device, a transformer 7, an input voltage detecting circuit 8, rectifying diodes 9 and 10 that configure a rectifying circuit, a smoothing reactor 11, a smoothing capacitor 12, an output voltage detecting circuit 13, an input current detecting circuit 14, and a current-to-voltage conversion circuit 15 between a high voltage battery 1, which forms an input power supply that generates a direct current voltage, and an external load 16 and a low voltage battery 17 on an output side.

The four switching elements 3 to 6 configuring the inverter device are connected on a subsequent stage side of the high voltage battery 1. MOSFETs, for example, are used as the switching elements 3 to 6. The control unit 2 drives the switching elements 3 to 6 so as to be turned on and off via control lines 30a to 30d. A connection point of a source of the switching element 3 and a drain of the switching element 4 is connected to one end of a primary winding of the transformer 7, and a connection point of a source of the switching element 5 and a drain of the switching element 6 is connected to another end of the primary winding of the transformer 7. Also, the input voltage detecting circuit 8 is connected in parallel with the high voltage battery 1 in order to detect an input voltage $V_{in}$.

The rectifying diodes 9 and 10 are connected to a secondary winding of the transformer 7. The smoothing reactor 11 and the smoothing capacitor 12 are connected in a stage subsequent to the rectifying diodes 9 and 10 for secondary side rectifying. Furthermore, the output voltage detecting circuit 13 is connected in parallel with the external load 16 in a stage subsequent to the smoothing reactor 11 in order to detect an output voltage $V_{out}$. Also, the input current detecting circuit 14 is provided in order to detect an input current $I_{in}$ input into the DC-DC converter 100. The control unit 2 acquires voltage information or current information from the input voltage detecting circuit 8, the output voltage detecting circuit 13, and the input current detecting circuit 14 via signal lines 31a to 31c respectively. In FIG. 1, $I_{out}$ is an output current, and $I_{Lf}$ is a current flowing through the smoothing reactor 11. Current detected in the input current detecting circuit 14 is converted into voltage by the current-to-voltage conversion circuit 15, and input into the control unit 2.

Next, a basic operation of the DC-DC converter 100 including this kind of circuit will be described, using FIGS. 2A, 2B, 3A, 3B, and 4. The DC-DC converter 100 of this embodiment is such that four operating modes, shown in FIGS. 2A, 2B, 3A, and 3B, exist in accordance with a state of each switching element 3 to 6.

Figure 2A:
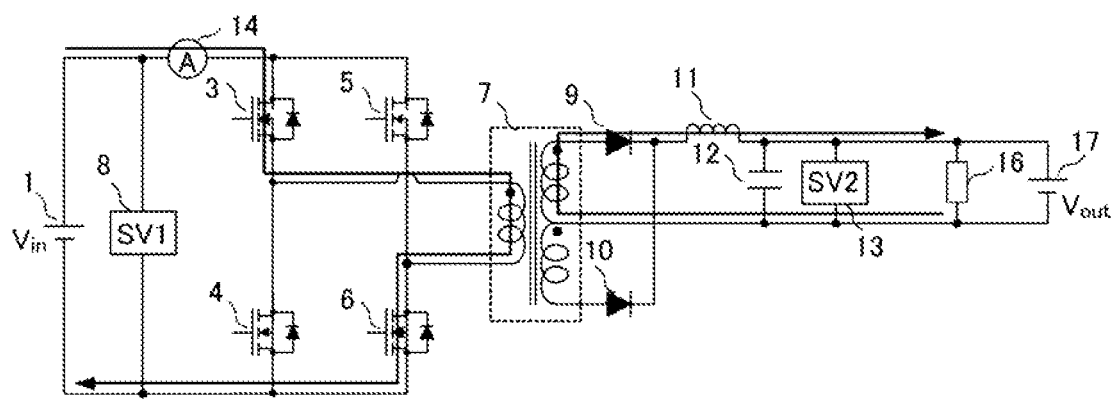
FIGS. 2A and 2B are drawings illustrating a switching mode of semiconductor switching elements in the power conversion device according to the first embodiment.

In mode 1 shown in FIG. 2A, the switching elements 3 and 6 are in an on-state, and the switching elements 4 and 5 are in an off-state. At this time, current flowing through the primary winding side of the transformer 7 flows along a path from the high voltage battery 1 through the switching element 3 and the transformer 7 (primary winding side) to the switching element 6. Herein, the transformer 7 transmits power from the primary side to the secondary side, and current flowing through the secondary winding side of the transformer 7 flows along a path from the transformer 7 (secondary winding side) through the rectifying diode 9 and the smoothing reactor 11 to the external load 16.

Figure 2B:
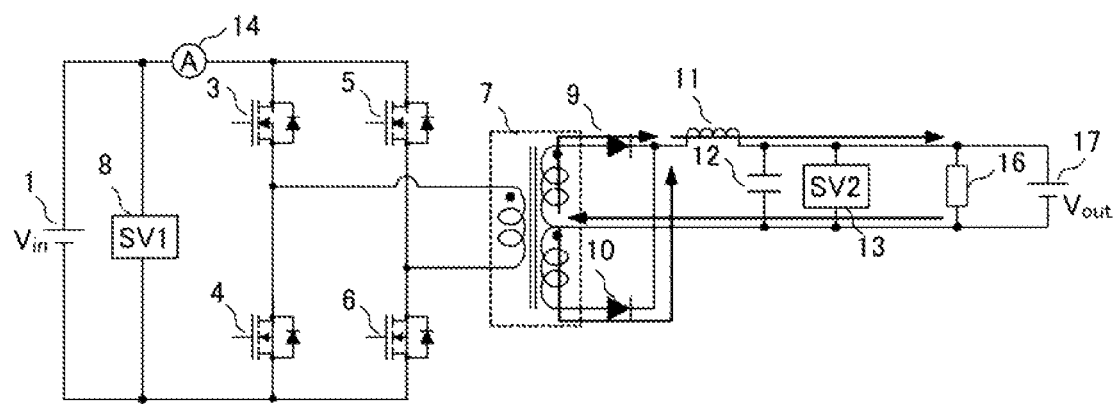

Also, in mode 2 shown in FIG. 2B, the switching elements 3 to 6 are all in an off-state. At this time, no current flows through the primary side of the transformer 7, and no power is transmitted to the secondary side. Note that owing to self-induction of the smoothing reactor 11, current flows along a path from the smoothing reactor 11 through the external load 16, the transformer 7 (secondary winding side), and the rectifying diodes 9 and 10 to the smoothing reactor 11 on the secondary side. At this time, no voltage is generated on the secondary side of the transformer 7, because of which the current $I_{Lf}$ flowing through the smoothing reactor 11 decreases.

Figure 3A:
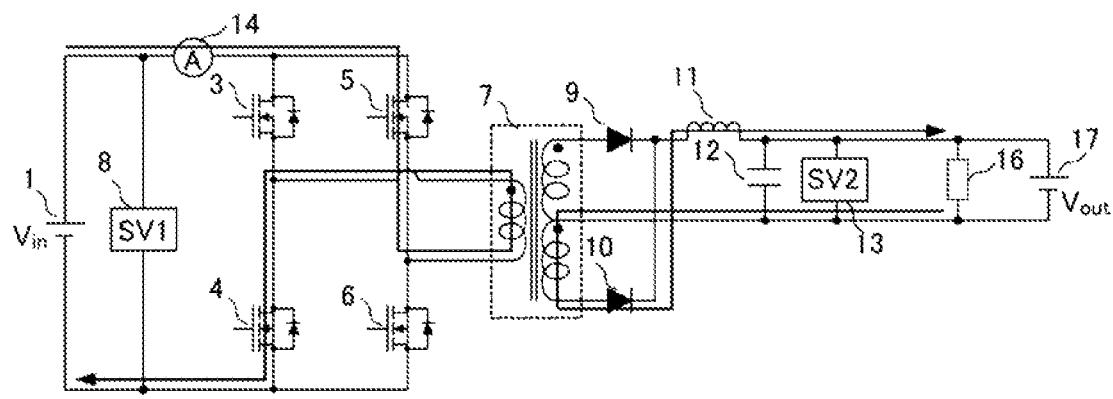
FIGS. 3A and 3B are drawings illustrating a switching mode of the semiconductor switching elements in the power conversion device according to the first embodiment.

In mode 3 shown in FIG. 3A, the switching elements 3 and 6 are in an off-state, and the switching elements 4 and 5 are in an on-state. At this time, current flowing through the primary winding side of the transformer 7 flows along a path from the high voltage battery 1 through the switching element 5 and the transformer 7 (primary winding side) to the switching element 4. Herein, the transformer 7 transmits power from the primary side to the secondary side, and current flowing through the secondary winding side of the transformer 7 flows along a path from the transformer 7

(secondary winding side) through the rectifying diode 10 and the smoothing reactor 11 to the external load 16.

Figure 3B:
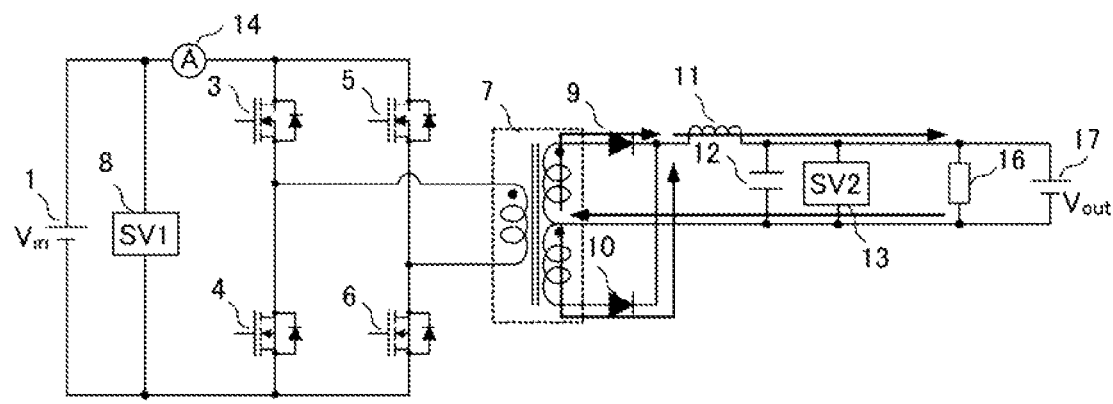

Also, in mode 4 shown in FIG. 3B, the switching elements 3 to 6 are all in an off-state. At this time, no current flows through the primary side of the transformer 7, and no power is transmitted to the secondary side. Note that owing to self-induction of the smoothing reactor 11, current flows along a path from the smoothing reactor 11 through the external load 16, the transformer 7 (secondary winding side), and the rectifying diodes 9 and 10 to the smoothing reactor 11 on the secondary side. At this time, no voltage is generated on the secondary side of the transformer 7, because of which the current $I_{Lf}$ flowing through the smoothing reactor 11 decreases.

Figure 4:
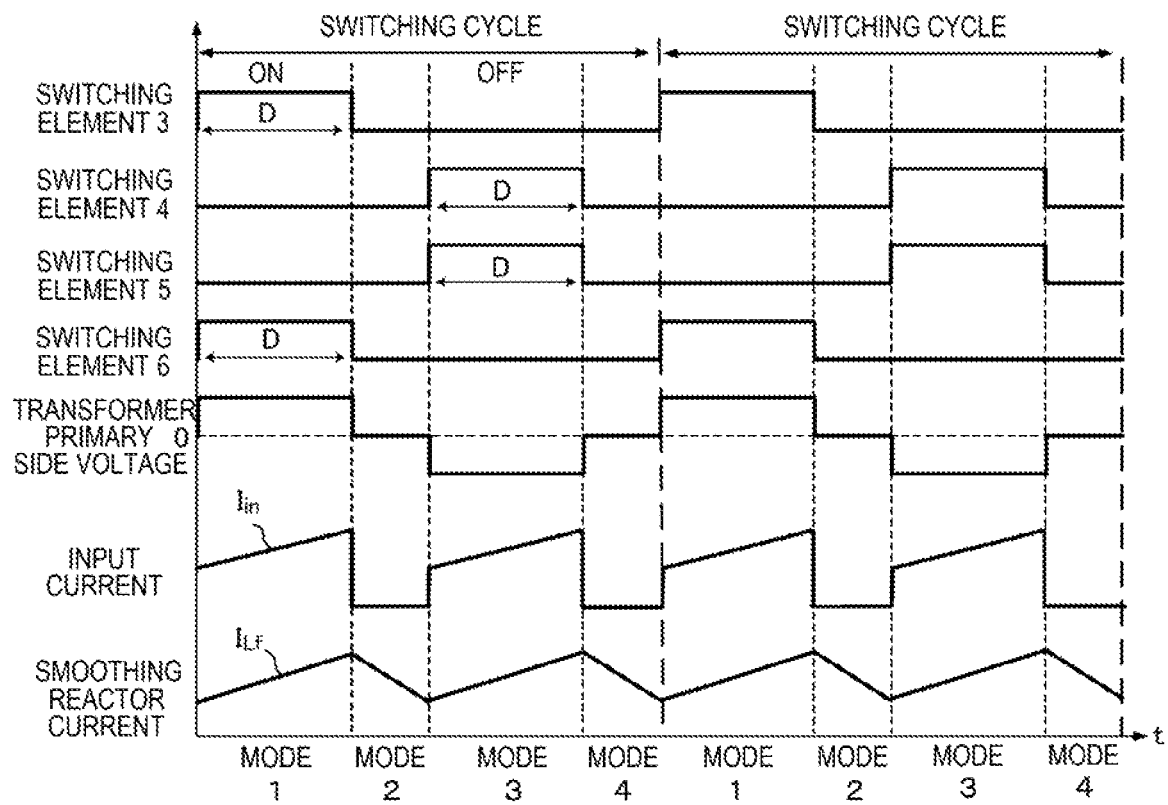
FIG. 4 is a drawing showing a signal and current time chart for each portion of the power conversion device according to the first embodiment.

After mode 4 shown in FIG. 3B is finished, the operation returns to mode 1 shown in FIG. 2A, and modes 1 to 4 are repeated. In each mode, an alternating current component of the current flowing through the smoothing reactor 11 is flowing through the smoothing capacitor 12. A signal and current time chart for each portion of the DC-DC converter 100 are shown in FIG. 4.

The control unit 2 controls the desired output voltage $V_{out}$ by causing the switching elements 3 to 6 to be turned on and off in this way, thereby adjusting a width of a duty ratio D.

Herein, when a voltage of the primary winding of the transformer 7 is $V_1$, a number of turns is $N_1$, and a current is $I_1$, and a voltage of the secondary winding is $V_2$, a number of turns is $N_2$, and a current is $I_2$, in mode 1 shown in FIG. 2A and mode 3 shown in FIG. 3A, the relationship of the following equation (1) is established.

$$N_1/N_2 = V_1/V_2 = I_2/I_1 \tag{1}$$

Herein, $N_1/N_2$ is called a turn ratio of the transformer 7.

As the input voltage $V_{in}$ is input into the primary side of the transformer 7, $V_1 = V_{in}$. Consequently, the following equation (2) is obtained from equation (1) above.

$$N_1/N_2 = V_{in}/V_2 \tag{2}$$

As shown in equation (2) above, the voltage $V_2$, which is equivalent to the input voltage $V_{in}$ applied to the primary side of the transformer 7 divided by the turn ratio, is generated on the secondary side of the transformer 7. That is, voltage $V_2 = \{1/(N_1/N_2)\} \times V_{in} = (N_2/N_1) \times V_{in}$. At this time, a voltage equivalent to the difference between the voltage $V_2$ and the output voltage $V_{out}(=V_2-V_{out})$ is applied across the smoothing reactor 11, because of which the current $I_{Lf}$ of the smoothing reactor 11 increases, as shown in mode 1 of FIG. 2A and mode 3 of FIG. 3A. Also, a current equivalent to the current $I_{Lf}$ of the smoothing reactor 11 divided by the turn ratio flows through the primary side of the transformer 7 at this time. That is, $I_{in} = (1/(N_1/N_2)) \times I_{Lf} = (N_2/N_1) \times I_{Lf}$.

Next, in mode 2 of FIG. 2B and mode 4 of FIG. 3B, the control unit 2 turns off the switching elements 3 to 6. Because of this, voltage is no longer applied to the primary side of the transformer 7, and $V_1 = V_{in} = 0$. Also, no current flows on the primary side of the transformer 7, and the input current $I_{in} = 0$.

Also, the output voltage $V_{out}$ is applied to the smoothing reactor 11 at this time, and the current $I_{Lf}$ of the smoothing reactor 11 decreases, as shown in mode 2 of FIG. 2B and mode 4 of FIG. 3B. Also, a current of the same value as the current $I_{Lf}$, which flows from a center tap to the smoothing reactor 11, flows into the secondary side of the transformer 7, and $I_2 = I_{Lf}$. Also, no voltage is generated on the secondary side of the transformer 7 either, and $V_2 = 0$.

A description will be given of a method whereby the control unit 2 estimates the input current $I_{in}$ and the output current $I_{out}$ in the DC-DC converter 100 of the first embodiment having the heretofore described kind of configuration.

Figure 5:
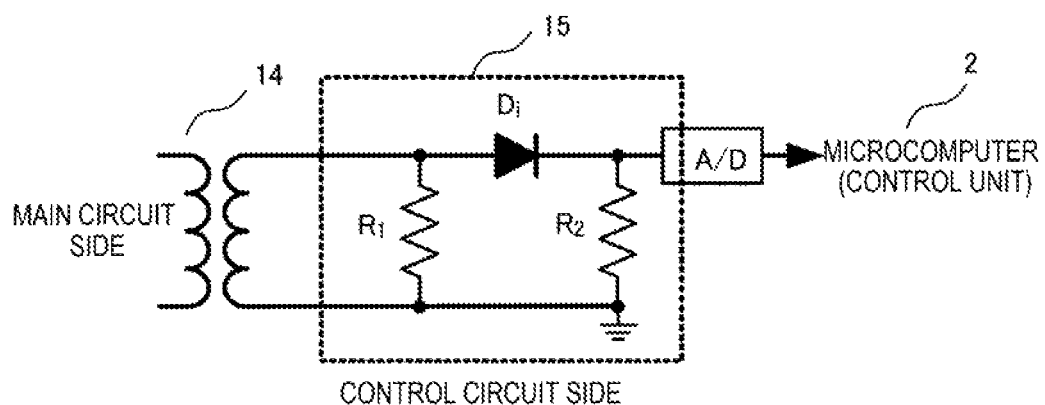
FIG. 5 is a circuit diagram showing an example of a current-to-voltage conversion circuit provided in the power conversion device according to the first embodiment.

FIG. 5 shows a circuit diagram of the input current detecting circuit 14, the current-to-voltage conversion circuit 15, and the control unit 2. The input current detecting circuit 14 is configured of a current transformer (hereafter called a CT) having a first winding and a second winding magnetically coupled to the first winding, and the input current $I_{in}$ flowing through the first winding (a main circuit side) is caused to flow into the current-to-voltage conversion circuit 15 in accordance with a turn ratio (1:N) of the CT. A reference sign $D_i$ in FIG. 5 indicates a diode.

Figure 6A:
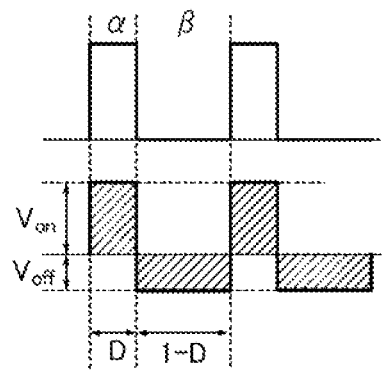
FIGS. 6A to 6D are drawings illustrating a path of current during an operation of flowing through the current-tovoltage conversion circuit and a current transformer in the power conversion device according to the first embodiment.
Figure 6B:
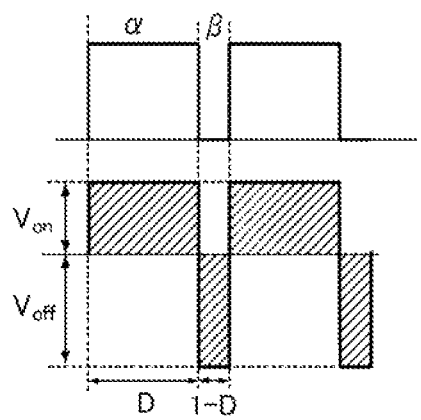

Next, the current-to-voltage conversion circuit 15 will be described, using FIGS. 6A to 6D. FIG. 6A shows a case in which the duty ratio D is small, and FIG. 6B shows a case in which the duty ratio D is large. Mode 1 and mode 3 illustrated in FIG. 4 are defined as an on-state section α in FIGS. 6A to 6D, and mode 2 and mode 4 are defined as an off-state section β in FIGS. 6A to 6D.

Figure 6C:
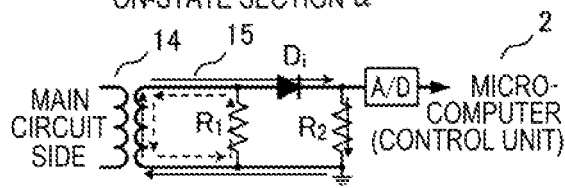

In the on-state section α, a current proportional to the turn ratio of the CT flows through the main circuit, as indicated by a solid line arrow in FIG. 6C. Current flowing through the second winding of the CT at this time is defined as a power transmitting current $I_{power}$ of the CT secondary side.

Figure 6D:
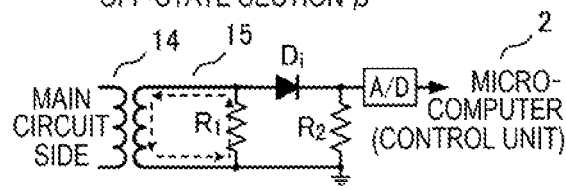

In the current-to-voltage conversion circuit 15 shown in FIGS. 6C and 6D, a relationship between resistances $R_1$ and $R_2$ is $R_1 > R_2$, and a greater portion of the power transmitting current $I_{power}$ flows into the resistance $R_2$ via the diode $D_i$.

Next, a current of an orientation opposite to that of the power transmitting current $I_{power}$ flows into the CT in the off-state section $, as indicated by a broken line arrow in FIG. 6D. The current flows in order to cause demagnetization of the CT, as the CT is excited by a voltage drop occurring in the resistance $R_2$ until immediately before the off-state section β. The current is defined as a reset current $I_{res}$. As the reset current $I_{res}$ is stopped in the diode $D_i$ at this time, the current does not flow into the resistance $R_2$.

As the reset current $I_{res}$ also flows in the on-state section α, as shown by a broken line arrow in FIG. 6C, voltages $V_{on}$ and $V_{off}$ applied to the CT in FIGS. 6C and 6D are expressed by the following equations (3) and (4).

$$V_{on} = R_2 \times (I_{power} - I_{res})^* \tag{3}$$

$$V_{off} = R_1 \times I_{res} \tag{4}$$

The control unit 2 filters voltage generated in the resistance $R_2$ in the on-state section α, uses the voltage after filtering as an AD conversion value (hereafter called an AD value), and computes the input current $I_{in}$.

Herein, when a switching frequency of the switching elements 3 to 6 of the DC-DC converter 100 is taken to be $f_{sw}$, the following equation (5) is obtained from a basic transformer principle.

$$V_{on} \times \frac{D}{f_{sw}} = V_{off} \times \frac{1-D}{f_{sw}} \tag{5}$$

The following equation (6) is derived from equations (3) to (5).

$$R_2 \times (I_{power} - I_{res}) = R_1 \times I_{res} \times \frac{1-D}{f_{sw}} \tag{6}$$

From equation (6), the power transmitting current $I_{power}$ and the reset current $I_{res}$ are expressed by the following equation (7).

$$\frac{I_{res}}{I_{power}} = \frac{1}{\frac{R_1 \times (1-D)}{R_2 \times D} + 1} \quad (7)$$

Accuracy can be increased by the control unit 2 carrying out AD conversion on a value of voltage generated by the power transmitting current $I_{power}$ in the on-state section α, and estimating the input current $I_{in}$, but in actuality, a value of voltage generated in the resistance $R_2$ changes due to a current generated in a direction opposite to that of the power transmitting current $I_{power}$ in accordance with the reset current $I_{res}$.

Figure 7A:
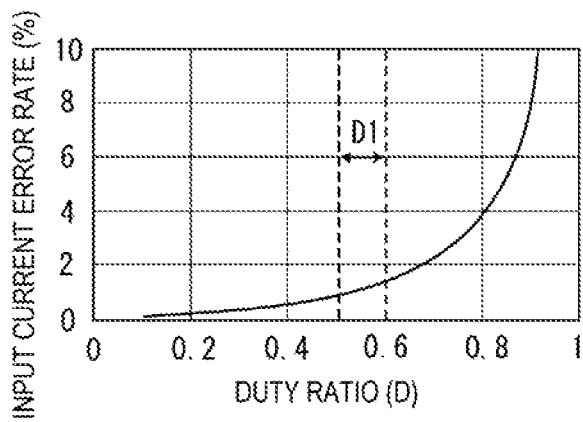
FIGS. 7A and 7B are a drawing illustrating a duty ratio of the switching elements and an input current error rate in the power conversion device according to the first embodiment, and an illustration showing an AD conversion value and an input current under predetermined voltage conditions.

When a proportion of the reset current $I_{res}$ with respect to the power transmitting current $I_{power}$ is taken to be an input current error rate (%), a relationship between the input current error rate and the switching duty ratio D when, for example, proportions of the resistance $R_1$ and the resistance $R_2$ are $R_1:R_2=100:1$ is as in FIG. 7A. That is, the proportion of the reset current $I_{res}$ increases in accordance with the duty ratio D increasing.

Figure 7B:
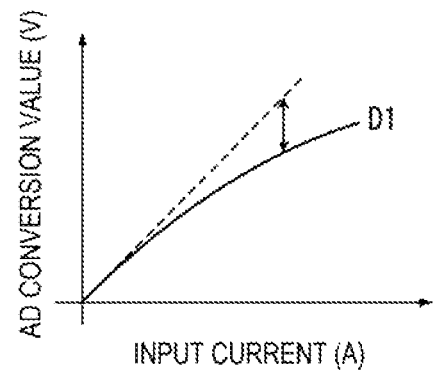

A relationship between the input current error rate and the duty ratio D for the predetermined input voltage $V_{in}$ and output voltage $V_{out}$ is shown by D1 in FIG. 7A. The duty ratio D having a predetermined range in D1 represents the point that as the amount of voltage drop also increases when the amount of current on the main circuit side increases, the duty ratio D of the semiconductor switching elements increases. A relationship between an AD value resulting from AD conversion and the input current $I_{in}$ actually flowing on the main circuit side in the D1 region is shown in FIG. 7B. As heretofore described, the duty ratio D increases when the current value increases, because of which the reset current $I_{res}$ increases, and the voltage drop generated in the resistance $R_2$ (equation 3) decreases in the on-state section α. A relationship between the AD value and the input current $I_{in}$ when the reset current $I_{res}$ is zero is shown by a dotted line in FIG. 7B.

The DC-DC converter 100 of the first embodiment computes the input current $I_{in}$ using a higher order function computation, based on a premise that a relationship between the AD value and the input current $I_{in}$ is non-linear, as in FIG. 7B. The arithmetic expression is shown in the following equation (8). α, β, and γ are coefficients, and the input current $I_{in}$ is calculated here as a quadratic function.

$$I_{in}(\text{computed value}) = \alpha \times (AD \text{ value})^2 + \beta \times (AD \text{ value}) + \gamma \quad (8)$$

Heretofore, a method of computing the input current $I_{in}$ in the D1 region in FIG. 7A has been described, but next, a method of computing the output current $I_{out}$ will be described.

The output current $I_{out}$ is estimated as in the following equation (9), using the input current $I_{in}$ (computed value) estimated using equation (8), the input voltage $V_{in}$ detected by the input voltage detecting circuit 8, and the output voltage $V_{out}$ detected by the output voltage detecting circuit 13.

$$I_{out}(\text{computed value}) = \{V_{in} \times I_{in}(\text{computed value}) \times \eta\}/V_{out} \quad (9)$$

Herein, η indicates power conversion efficiency. For example, efficiency map data are stored in a microcomputer interior, and the control unit 2 may output the power conversion efficiency η from the predetermined input voltage $V_{in}$, output voltage $V_{out}$, and input current $I_{in}$ (computed value), and use the power conversion efficiency η in the aforementioned arithmetic expression.

Figure 8A:
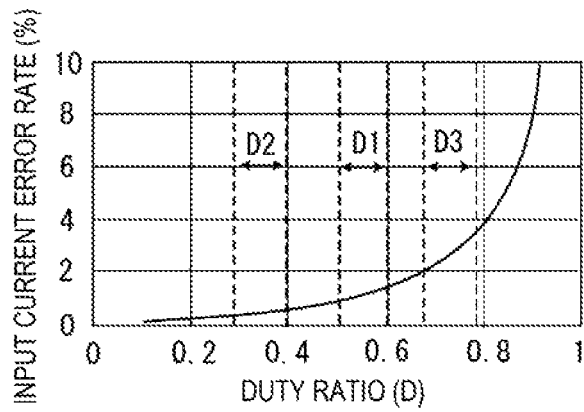
FIGS. 8A and 8B are a drawing illustrating a duty ratio of the switching elements and an input current error rate in the power conversion device according to the first embodiment, and a drawing illustrating an AD conversion value and an input current under various input/output voltage conditions.
Figure 8B:
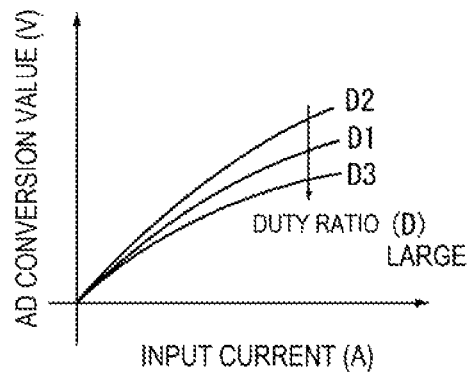

With regard to the relationship between the input current $I_{in}$ and the AD value illustrated in FIGS. 7A and 7B, relationship drawings of cases in which the input/output voltage relationship (duty ratio range) changes are shown in FIGS. 8A and 8B.

When a case in which the input voltage $V_{in}$ is higher and the output voltage $V_{out}$ is lower than in the D1 region is D2, and a case in which the input voltage $V_{in}$ is lower and the output voltage $V_{out}$ is higher than in the D1 region is D3, as shown in FIG. 8A, the relationship between the input current $I_{in}$ and the AD value in each of the D1 region to the D3 region is as shown in FIG. 8B. As shown in FIG. 8B, the input current $I_{in}$ and the AD value have a non-linear relationship in each input/output voltage range. Because of this, the control unit 2 of the DC-DC converter 100 of the first embodiment derives the α, β, and γ coefficients from the input voltage $V_{in}$ and the output voltage $V_{out}$ using the following equation (10).

$$\alpha = f(V_{in}, V_{out})$$

$$\beta = f(V_{in}, V_{out})$$

$$\gamma = f(V_{in}, V_{out}) \quad (10)$$

As heretofore described, the control unit 2 computes the input current $I_{in}$ and the output current $I_{out}$ from equations (8) and (9), using the coefficients α, β, γ, and efficiency η derived from the input voltage $V_{in}$ and the output voltage $V_{out}$.

The DC-DC converter 100 described in the first embodiment computes the input current $I_{in}$ from a quadratic function using the input voltage $V_{in}$, the output voltage $V_{out}$, and the current/voltage circuit AD value, but not being limited to this, a cubic function, or a function of a higher order, for example, may be used.

Figure 9A:
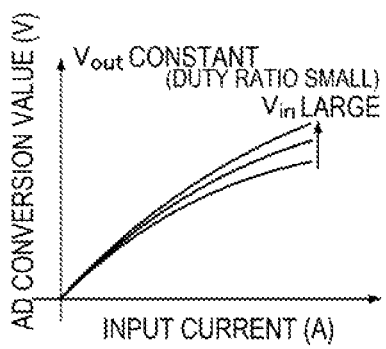
FIGS. 9A to 9C are illustrations showing a modification of an input current estimating method of the power conversion device according to the first embodiment.

For example, a ROM or a controller area network (CAN) function that can store voltage value information is included in the input side high voltage battery, and voltage information is transmitted to the control unit 2 by the CAN or the like, or the like, as in a case wherein information on the input voltage $V_{in}$ is transmitted from a vehicle-side electronic control device in an exterior of the DC-DC converter 100, and when there is no sensor circuit in an interior of the DC-DC converter 100, accuracy is poor, and the information cannot be used, the relationship between the AD value and an input current value varies in accordance with the input voltage $V_{in}$ when the output voltage $V_{out}$ is constant, as shown in FIG. 9A.

Figure 9B:
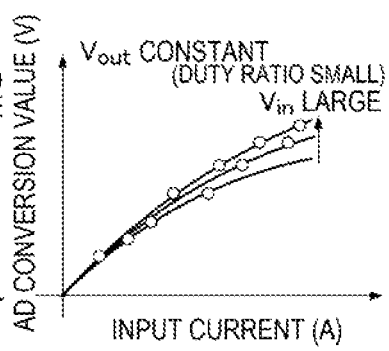
Figure 9C:
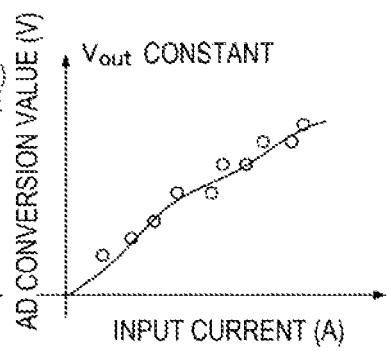

In this case, when the input voltage value of the input voltage $V_{in}$ is not used, the AD value fluctuates with each input current, as shown in FIG. 9B. A non-linear function such that the relationship between the AD value and the input current value is minimal is shown in FIG. 9C. For example, when the function shown in FIG. 9C is a cubic function, the input current $I_{in}$ is estimated using the following equation (11). α, β, γ, and a in equation (11) are coefficients.

$$I_{in}(\text{computed value}) = \alpha \times (AD \text{ value})^3 + \beta \times (AD \text{ value})^2 + \gamma \times (AD \text{ value}) + \delta \quad (11)$$

Herein, when the output voltage $V_{out}$ changes, the coefficients α, β, γ, and a change, because of which each is derived using the following equation (12).

$$\alpha = f(V_{out})$$

$$\beta = f(V_{out})$$

$$\gamma = f(V_{out})$$

$$\delta = f(V_{out}) \tag{12}$$

In the same way, when only the input voltage $V_{in}$ is used, with the output voltage $V_{out}$ not being used, each coefficient derived in equation (12) is a function of the input voltage $V_{in}$.

Using the input current $I_{in}$ derived using equations (11) and (12), the output current $I_{out}$ is computed using equation (9).

When a voltage sensor value of only one side is used, as heretofore described, or a voltage sensor value of only one side can be used in a case in which further computing accuracy is required, accuracy decreases in comparison with a case in which both voltage sensor values are used. The reason is that the relationship between the AD value and the amount of input current changes in accordance with the input/output voltage, as heretofore described. Also, the amount of the output current $I_{out}$ flowing is greater than that of the input current $I_{in}$ by an amount equivalent to the turn ratio of the transformer 7, because of which an error in computing the output current $I_{out}$ also increases by an amount equivalent to the turn ratio.

Therefore, the first embodiment is such that when a voltage sensor of only one side is used for computation, for example, when estimating the input current $I_{in}$ by using a value of an output voltage detected by the output voltage detecting circuit 13, the accuracy of the output current $I_{out}$ is increased by reflecting an amount of change in the AD value, which varies in accordance with the input voltage $V_{in}$, in the efficiency value, thereby correcting the efficiency value. The arithmetic expression in this case is shown in the following equation (13).

$$I_{out}(\text{computed value}) = \{V_{in} \times I_{in}(\text{computed value}) \times \eta'\} / V_{out} \tag{13}$$

Herein, $\eta'$ is a corrected efficiency wherein a correction amount is added to the efficiency $\eta$.

By using the corrected efficiency $\eta'$ wherein a correction amount is added to the efficiency $\eta$ in this way, the accuracy of computing the output current $I_{out}$ can be improved. The same applies when using an input voltage value.

According to the DC-DC converter 100 according to the first embodiment, as heretofore described, an input current amount and an output current amount can be accurately estimated without providing a special circuit.

Second Embodiment

Next, a DC-DC converter according to a second embodiment will be described.

The DC-DC converter according to the second embodiment has the same circuit configuration as in the first embodiment, and a current computing method is also the same, but by the diode $D_i$ configuring the current-to-voltage conversion circuit 15 in the first embodiment being replaced with a Schottky diode, not only is an advantage equivalent to that of the first embodiment achieved, but also a temperature characteristic effect is improved.

Figure 10A:
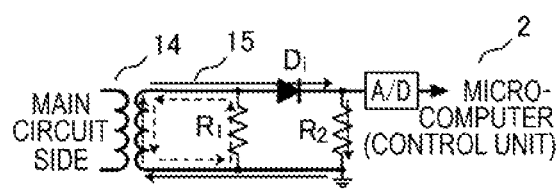
FIGS. 10A and 10B are drawings illustrating a current path when diode recovery occurs in an existing current-to-voltage conversion circuit in a power conversion device according to a second embodiment.
Figure 10B:
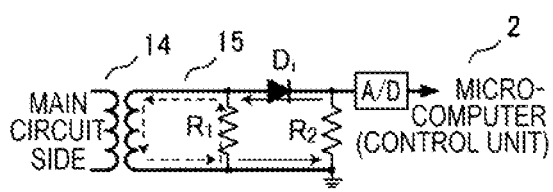

FIGS. 10A and 10B are illustrations of a case in which the normal diode $D_i$ is used in the current-to-voltage conversion circuit 15, as described in the first embodiment, wherein FIG. 10A shows the on-state section $\alpha$, and FIG. 10B shows the off-state section $\beta$.

An operation of the voltage/current converting circuit 15 is illustrated in FIGS. 6A to 6D of the first embodiment, but a reverse voltage is applied across the diode $D_i$ immediately after switching from the on-state section $\alpha$ to the off-state section $\beta$. At this time, a recovery current is generated in the diode $D_i$. The recovery current of the diode $D_i$ is indicated by a solid line arrow in the off-state section $\beta$ of FIG. 10B.

Figure 11:
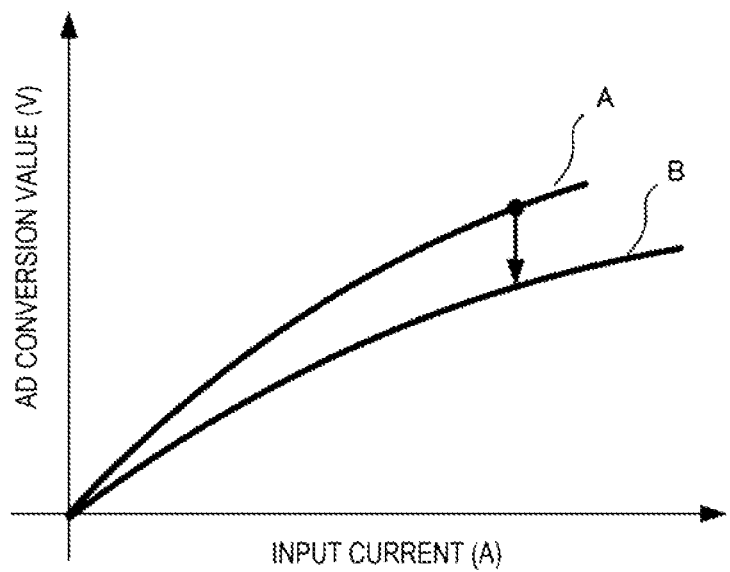
FIG. 11 is a drawing illustrating an AD conversion value and an input current when a recovery current is generated in the current-to-voltage conversion circuit of FIGS. 10A and 10B.

It is understood that the recovery current is generated with an orientation opposite to that of the power transmitting current $I_{power}$ of the CT secondary side. Because of this, voltage generated in the resistance $R_2$ is of an orientation opposite to that of voltage generated due to the power transmitting current $I_{power}$, because of which it is understood that the AD value detected by the control unit 2 (after filtering) is such that the AD value decreases further the greater the recovery current when the same input current $I_{in}$ is supplied. A result of this is shown in FIG. 11. In FIG. 11, a curved line indicated by reference sign A is a relationship between the input current $I_{in}$ and the AD value when no recovery current is generated, and a curved line indicated by reference sign B is a relationship between the input current $I_{in}$ and the AD value when a recovery current is generated.

Figure 12:
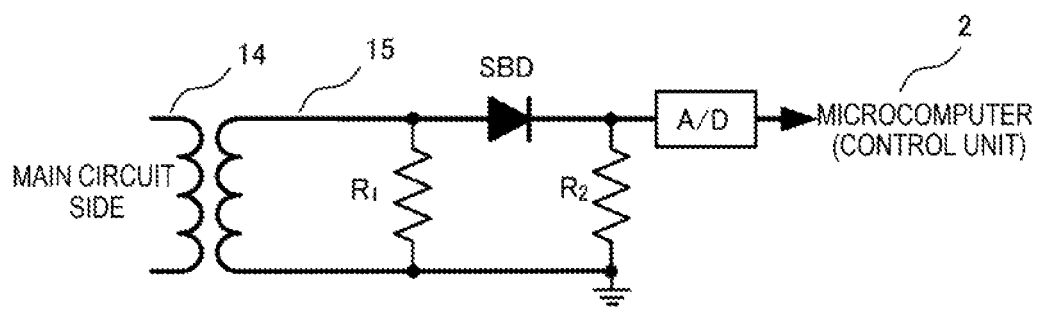
FIG. 12 is a drawing showing the current-to-voltage conversion circuit of the power conversion device according to the second embodiment.

Therefore, a Schottky barrier diode SBD shown in FIG. 12 is used instead of the normal diode $D_i$ as the diode of the current-to-voltage conversion circuit 15 in the DC-DC converter according to the second embodiment. Because of this, the recovery current can decrease, because of which variation of the AD value due to a temperature effect is eliminated.

By the Schottky barrier diode SBD being used instead of a normal diode as the diode of the current-to-voltage conversion circuit 15 in the DC-DC converter according to the second embodiment, not only is an advantage equivalent to that of the first embodiment achieved, but also an advantage is achieved in that a temperature characteristic effect is improved.

The Schottky barrier diode SBD is used as the diode of the current-to-voltage conversion circuit 15 in the DC-DC converter according to the second embodiment, but not being limited to this, for example, a silicon carbide diode may be used. As a recovery current is smaller in a silicon carbide diode than in a silicon diode, the advantage in that a temperature characteristic effect is improved is greater.

Third Embodiment

Next, a DC-DC converter according to a third embodiment will be described.

Figure 13:
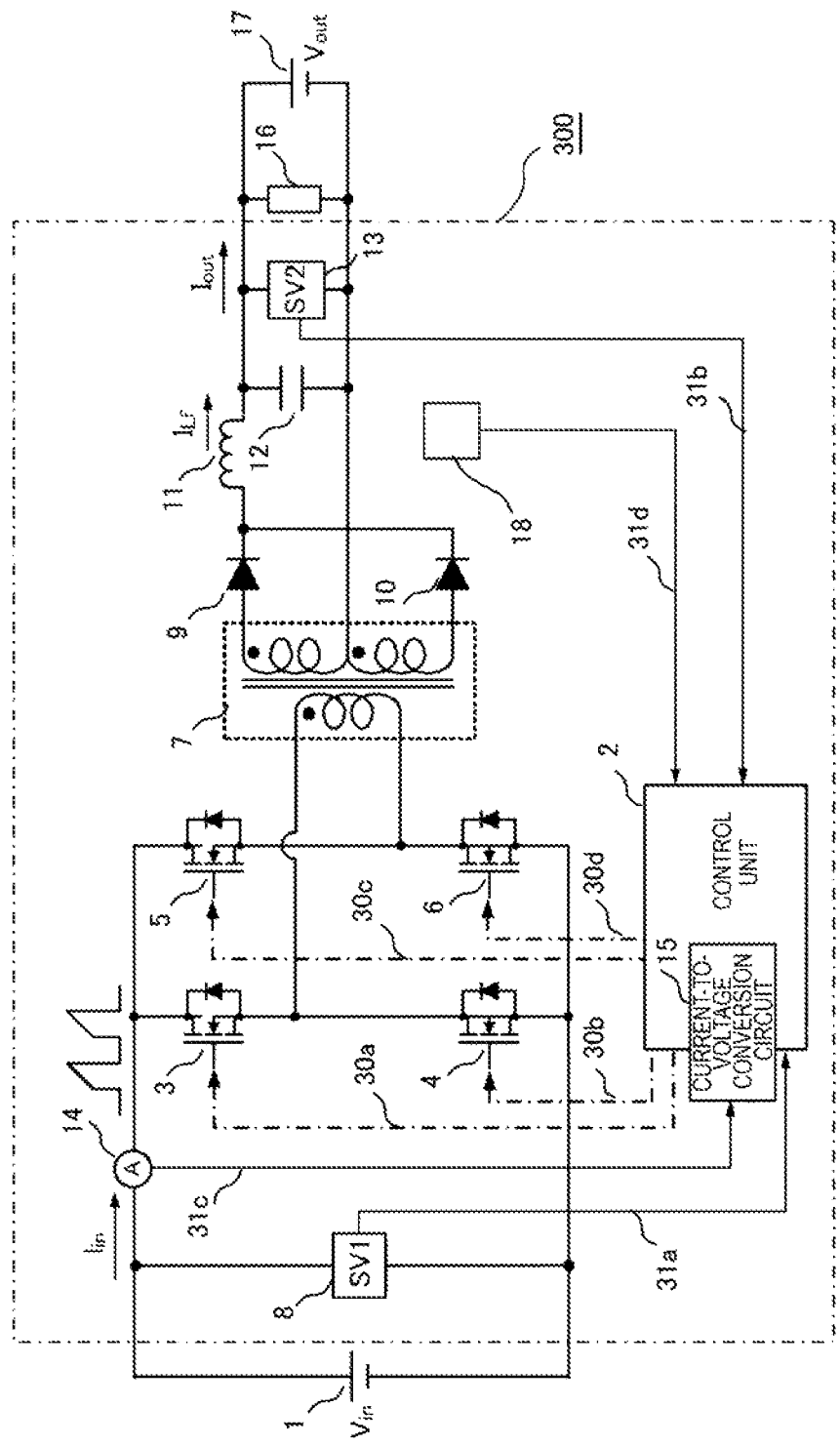
FIG. 13 is a circuit drawing showing a configuration of a power conversion device according to a third embodiment.

The DC-DC converter of the third embodiment includes a temperature sensor 18 in an interior of a DC-DC converter 300, as shown in FIG. 13, and the control unit 2 is configured so as to acquire temperature information via a signal line 31$d$. The temperature sensor 18 detects at least either one of a temperature of the interior of the DC-DC converter 300 and a temperature of a cooling system that cools the DC-DC converter 300. As other portions are the same as in the first embodiment, the same reference signs are allotted, and redundant descriptions will be omitted.

As described in the second embodiment, the relationship between the actual input current $I_{in}$ and the AD value acquired by the control unit 2 differs in accordance with temperature. Because of this, the DC-DC converter 300 according to the third embodiment is such that the control unit 2 computes the input current $I_{in}$ taking a temperature value T acquired from the temperature sensor 18 into consideration, as shown in the following equation (14), in addition to the AD value and the current input voltage value and output voltage information used in the input current $I_{in}$ computing method described in the first embodiment (for example, equation 8).

$$I_{in}(\text{computed value}) = f(AD\ \text{value}, V_{in}, V_{out}, T) \quad (14)$$

For example, in a case in which the AD value decreases by approximately 10% between a normal temperature region (for example, 25° C.) and a high temperature region (for example, 105° C.) when the input current $I_{in}$ is the same, the control unit 2 computes so as to correct the AD value by approximately 10% using equation (14).

In the same way, the control unit 2 computes using the temperature value T when computing the output current $I_{out}$ too. For example, when the efficiency of the high temperature region decreases, the control unit 2 may compute with efficiency as a temperature function, as shown in the following equation (15).

$$I_{out}(\text{computed value}) = f(AD\ \text{value}, V_{in}, V_{out}, I_{in}(\text{computed value}), \eta, T) \quad (15)$$

Herein, the current computing method is such that the input current $I_{in}$ is estimated using a higher order functionalized arithmetic expression with the AD value as an input, but not being limited to this, a method may be such that, for example, a function such as a ROM in which a map or the like can be stored is included in the control unit 2, and the current value is output with the AD value, the temperature value, and the input/output voltage values as inputs.

The transformer 7 of the DC-DC converters 100 and 300 described in the embodiments has been described as a center tap type, but not being limited to this, a configuration wherein both ends of the secondary winding are connected to an intermediate point of diodes of a full-bridge configuration may be adopted.

In the same way, a center tap winding of the secondary winding of the transformer 7 of the DC-DC converters 100 and 300 described in the embodiments is connected to a negative electrode side of the low voltage battery 17, and the two ends of the secondary side winding of the transformer 7 are connected to anode sides of the rectifying diodes 9 and 10, but not being limited to this, a configuration may be such that the center tap winding of the secondary winding of the transformer is connected to the smoothing reactor 11, the two ends of the secondary side winding of the transformer 7 are connected to a cathode side of the rectifying diodes 9 and 10, and anodes of the rectifying diodes 9 and 10 are connected to the negative electrode side of the low voltage battery 17.

Also, the DC-DC converters 100 and 300 described in the embodiments are step-down converters wherein the voltage on the output side is lower than the voltage on the input side, but not being limited to this, the DC-DC converters 100 and 300 may be step-up converters wherein the voltage on the output side is higher than the voltage on the input side.

Also, the switching control method of the DC-DC converters 100 and 300 according to the embodiments is a hard switching method, but not being limited to this, the switching control method may be, for example, a phase shift control method. In this case, the control unit 2 controls the switching element 3 and the switching element 6 as one switching element pair, and controls each of the switching elements 4 and 5 by causing phases thereof to be staggered by half a cycle (a 180° phase shift). A signal and current time chart for each portion are shown in FIG. 14.

Figure 14:
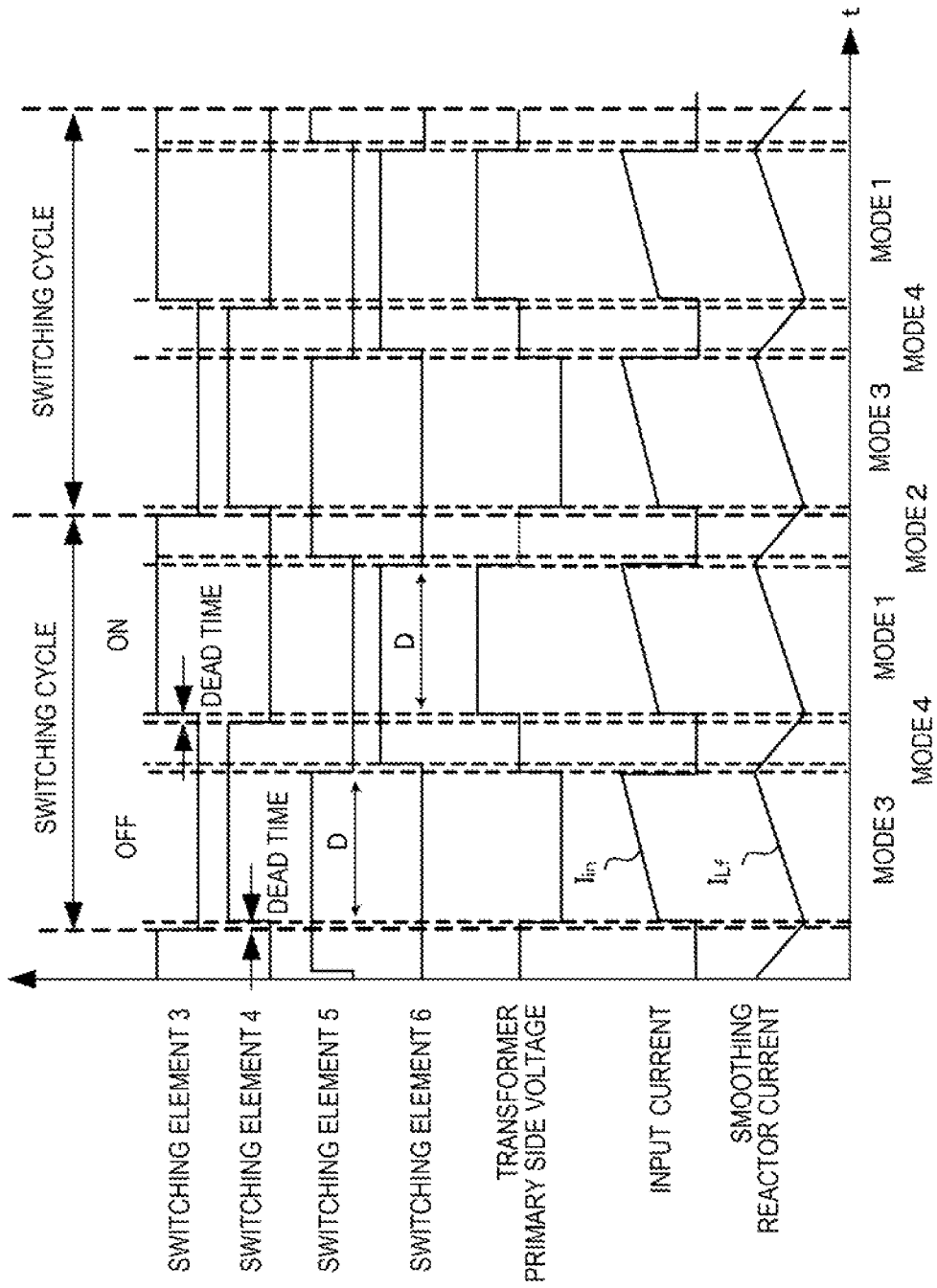
FIG. 14 is a drawing showing a signal and current time chart for each portion of a modified form of the power conversion devices according to the first to third embodiments.

In FIG. 14, the switching elements 3 and 4 and the switching elements 5 and 6 are controlled so as to be turned on and off with a dead time td provided so that upper and lower arms do not short-circuit. In this way, in the example of FIG. 14, the input current $I_{in}$ is 0, and the current $I_{Lf}$ of the smoothing reactor 11 decreases, despite not all of the switching elements 3 to 6 being in an off-state in mode 2 shown in FIG. 2B and mode 4 shown in FIG. 3B. This indicates that an advantage the same as in the case of FIG. 4 described in the first embodiment is also obtained in FIG. 14.

Although the present application is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A power conversion device, comprising:
   an inverter device that is connected to an input power supply generating a direct current voltage, has a plurality of switching elements, and converts the direct current voltage into an alternating current voltage by switching between an on-state and an off-state of the plurality of switching elements;
   a transformer that has a primary winding and a secondary winding, converts a voltage applied across the primary winding by the inverter device into a differing voltage, and outputs the differing voltage to the secondary winding;
   a rectifying circuit that rectifies an alternating current voltage output from the secondary winding of the transformer;
   a smoothing reactor that smooths an output from the rectifying circuit;
   a smoothing capacitor that smooths a voltage waveform of a current flowing through the smoothing reactor, and outputs the smoothed voltage waveform as an output voltage;
   a control unit that controls the plurality of switching elements so as to be turned on and off;
   an input current detecting circuit that has a first winding and a second winding magnetically coupled to the first winding, wherein the first winding is connected in series between the input power supply and the plurality of switching elements; and
   a current-to-voltage conversion circuit connected to the second winding of the input current detecting circuit and configured to output a voltage which is input as a conversion value into the control unit,
   wherein the control unit estimates a current input into the inverter device from the conversion value,
   wherein the current-to-voltage conversion circuit comprises:
   a first resistor connected to ends of the second winding,
   a second resistor connected in parallel to the first resistor, and
   a diode connected in series with the first resistor and the second resistor, and having an anode connected to the second winding and the first resistor and a cathode connected to the second resistor, and wherein a resistance of the first resistor is greater than a resistance of the second resistor.

2. The power conversion device according to claim 1, wherein the input current is estimated using a higher order function.

3. The power conversion device according to claim 1, comprising:

an input voltage detecting unit that detects an input voltage of the inverter device; and an output voltage detecting unit that detects the output voltage, wherein the control unit derives a power conversion efficiency of the inverter device based on the input voltage detected by the input voltage detecting unit, the output voltage detected by the output voltage detecting unit, and the input current estimated by the control unit, and the control unit estimates a current to be output to an exterior using the input voltage, the output voltage, the input current, and the power conversion efficiency.

4. The power conversion device according to claim 3, wherein the control unit includes a higher order computing parameter used for estimating the input current from the conversion value, and changes the computing parameter in accordance with a sensor value for either one, or both, of the input voltage and the output voltage.

5. The power conversion device according to claim 3, wherein the control unit includes a higher order computing parameter used for estimating the input current from the conversion value, estimates the input current from the conversion value by changing the computing parameter in accordance with the output voltage, and estimates the output current by adding an amount of variation of the conversion value, which varies in accordance with the input voltage, to the power conversion efficiency.

6. The power conversion device according to claim 3, wherein the control unit includes a higher order computing parameter used for estimating the input current from the conversion value, estimates the input current from the conversion value by changing the computing parameter in accordance with the input voltage, and estimates the output current by adding an amount of variation of the conversion value, which varies in accordance with the output voltage, to the power conversion efficiency.

7. The power conversion device according to claim 4, comprising a temperature sensor that detects at least either one of a temperature of an interior and a temperature of a cooling system that cools the power conversion device, wherein the control unit corrects the computing parameter in accordance with a temperature detected by the temperature sensor.

8. The power conversion device according to claim 1, wherein the current-to-voltage conversion circuit includes a diode that rectifies a current flowing through a secondary side of the input current detecting circuit, and the diode is configured of a Schottky barrier diode.

9. The power conversion device according to claim 1, wherein the current-to-voltage conversion circuit includes a diode that rectifies a current flowing through a secondary side of the input current detecting circuit, and the diode is configured of a silicon carbide diode.

* * * * *